INVENTORS
JOSEPH N. KUZMICK
JOHN B. LITTLEFIELD
ATTORNEYS.

3,227,249
MOLDED COMPOSITION BRAKE SHOE COMPRISING ORGANIC BOND, HARD MINERAL FILLER, AND CRYOLITE
Joseph N. Kuzmick, Clifton, N.J., and John B. Littlefield, Monsey, N.Y., assignors to Raybestos-Manhattan, Inc., Passaic, N.J., a corporation of New Jersey
Filed June 25, 1959, Ser. No. 822,831
5 Claims. (Cl. 188—251)

This invention relates to molded composition brake shoes and more particularly to composition brake shoes for railroad rolling stock.

Railroad composition brake shoes are known in which hard mineral particles having a hardness in the range greater than 6 on the Moh scale are compounded with an organic bond comprising synthetic rubbers, natural rubber and synthetic resins, the hard mineral particles functioning to impart in operation a wet to dry friction ratio approaching unity. Such hard mineral particles or fillers may comprise iron turnings, white iron grit, silica sand, amorphous silica, mullite, calcined kyanite and combinations thereof.

Under high energy operation, where wheel tread temperatures reach 800°–1000° F. and where interface temperatures exceed 2000° F., the rate of wheel wear becomes excessive and even exceeds that of the iron brake shoe which has been used for many years for braking railroad rolling stock.

The prime object of the present invention relates to the making of a composition railroad brake shoe possessing the known properties of wet to dry friction ratio approaching unity, a uniformity of friction over the range of operating temperatures encountered in service, and structural stability and strength, which is additionally characterized by a very marked reduction in wheel tread or wear thereby increasing the tread life of the railroad wheels.

Figure 1:
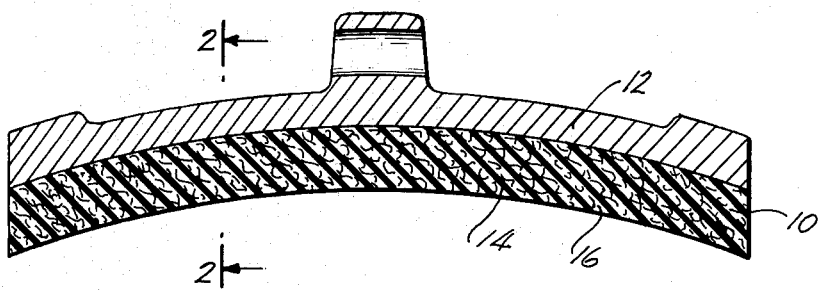
Figure 2:
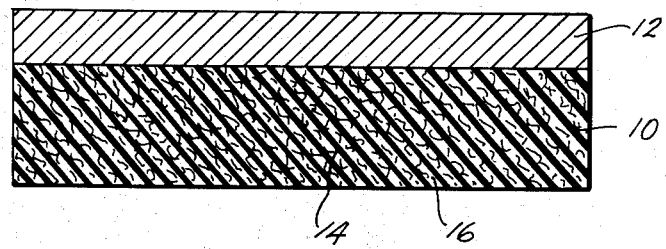

To the accomplishment of this object and such other objects as may hereinafter appear, our present invention relates to the molded composition brake shoes as more particularly defined in the appended claims and described in the following specification taken together with the accompanying drawings, in which:

FIG. 1 is a longitudinal cross-sectional view of a conventionally indicated mounted brake shoe; and FIG. 2 is a cross-sectional view thereof taken across the line 2—2 of FIG. 1.

The present invention relates particularly to the composition of the molded brake shoe 10 shaped arcuately in longitudinal direction for being mounted on and firmly attached to the metal shoe 12, the latter forming part of the railway equipment. The composition shoe is shown to comprise a rubber-resin bond 14 and friction fillers 16 as hereinafter particularly described.

The essential ingredients or components of our composition brake shoe are an organic bond matrix, a hard mineral filler and cryolite.

The organic bond, forming the matrix of the composition shoe, comprises a synthetic rubber-resin bond of a character which may be characterized as a heat-softening bond, that is one which is capable of softening at the elevated operating temperatures encountered so as to make the friction element compatible with or conformable to the metal wear surface (the wheel). Such bonds are preferably synthetic rubbers such as butadiene-styrene (GR–S) Buna copolymers, synthetic resins such as cashew nut shell liquid resins or cashnew resins and combinations thereof. Such bonds may also be oil modified phenol-aldehyde resins, elastomer-modified phenol-aldehyde resins, elastomers (natural rubber, GR–S rubber, nitrile rubber) with varying degrees of sulphur and peroxide cures, or mixtures of phenol-aldehyde, cashew resins and elastomers. These all achieve the desired yield at elevated temperature. These bonds may also be compounded with hard (cured) rubber dust and with Cardolite (cured cashew resin) in certain of the composition shoes of the invention.

The hard mineral filler comprises hard iron particles such as cast iron turnings or white iron grit, calcined kyanite, or combinations thereof; and the purpose or function of the hard mineral filler particles is to obtain a wet to dry friction ratio or coefficient of the railroad brake shoe approaching unity. Other hard mineral fillers having a hardness of 6 to 7½ on the Moh scale, such as silica sand, silica gel or nephthelene cyanate may also be used.

We have found that it is possible to obtain good wheel life, better than with the use of an iron (cast iron) shoe, in composition shoes containing sufficient hard mineral filler particles (used for securing the desired wet to dry substantially unity friction ratio) employing an organic bond in the shoe composition in a weight proportion of over 25%. This is done however at the expense of yielding poorer heat stability, resulting in a wider than the desired range of friction with operating temperatures and a poorer structural stability. We believe that the reasons why such higher organic content improves the wheel wear is that such organic content protects the wheel tread against wear by the hard mineral particles because (a) the softening of the organic bond due to heat depresses the particles into the shoe surfaces under severe operating conditions and (b) the continuous distillation of organic materials from the substrate to the surface prevents the formation of a hard, brittle, heat resistant surface from which these hard filler particles might otherwise break loose and roll and slide between the shoe and wheel tread surfaces.

We have found that by the addition of cryolite to such a shoe composition, even with the use of a higher organic bond content (over 25%), tread or wear of the contacted wheel may be substantially reduced. We have further found that by the addition of cryolite to the composition of the general order of 10% by weight of the composition, with a total organic bond content of less than 25%, a composition shoe is obtained characterized by a very marked reduction in wheel wear, such composition shoe otherwise having the desired properties of a wet to dry friction ratio approaching unity, a uniformity of friction over the range of operating temperatures encountered in service, and structural strength and stability. The preferred range of cryolite in the composition is from 5% to 15%, and the preferred range of organic bond content is from 15% to 25%, by weight of the shoe composition.

The reason that cryolite achieves the objective of reduced wheel tread wear is that this mineral melts or fluxes at the interface at temperatures of the order of 2000° F., where the organic bond is completely burned out, and acts as a secondary binder; it then wets the hard mineral particles and holds them tightly so that they do not as readily become free to roll and slide between the shoe and wheel tread surfaces. Also as this cryolite flux becomes fluid it can act as an interface lubricant and thus reduce abrasion.

Inorganic fillers are also preferably added to the shoe composition. Litharge and magnesium oxide serve to stiffen or reinforce the organic bond; lead powder acts as a lubricant at the low temperature friction range asbestos fibre when used is added to improve the structural strength of the composition; and graphite, galena, and calcined coke are employed to help steady the friction by preventing a build up of friction at the high temperatures.

The following examples illustrate the embodiment of our invention:

Example I

The ingredients of this example are:

|  | Weight Percent | Volume Percent |
|---|---|---|
| Milled Rubber Bond: |  |  |
| GR-S Synthetic Rubber | 5.76 | 15.31 |
| Sulfur | 1.73 | 2.10 |
| Cashew Polymer | 2.88 | 6.94 |
| Litharge | 4.32 | 1.15 |
| Lead Powder | 1.44 | .32 |
| Carbon Black | .77 | 1.07 |
| Hexa (Hexamethylene Tetramine) | .38 | .92 |
| MgO, Heavy Calcined | 1.92 | 1.50 |
|  | 19.2 | 29.31 |
| Graphite, fine, synthetic | 6.0 | 6.35 |
| Galena, Natural ore concentrate | 10.0 | 3.35 |
| Cashew resin solution 80% solids in toluol, solids | 9.6 | 23.05 |
| Calcined Kyanite | 12.0 | 8.58 |
| Calcined Petroleum Coke | 5.2 | 6.97 |
| White Iron Grit | 20.0 | 6.38 |
| Cryolite, fine | 10.0 | 8.32 |
| Asbestos | 8.0 | 7.85 |
|  | 100.0 | 100.16 |

Toluol 3.25% on total solids plus 2.40% from the cashew resin solution.

The ingredients of this example were compounded (mixed and cured) as follows:

The cashew polymer was sheeted out on a rubber mill ⅛″–³⁄₁₆″ thick and baked in trays in an electric-air oven for 1 hour at 275° F. The polymer was again sheeted out on a tight mill and the hexa was added. The synthetic rubber was then worked in, and then the carbon black, litharge, lead powder, MgO, and finally the sulphur. This milled bond was then sheeted out thin. The bond was then soaked in cans with the added toluol for at least 48 hours. The iron grit ingredient was added in this step, the grit being added above and below the bond to prevent the bond from sticking to the can. This composite product was kept well sealed and warm during the soaking period. The bond, grit, and added galena were then put in a pressure type sigma blade mixer, worked to a paste, and the cashew resin was added and the resulting product again worked to a paste. The kyanite was then added and mixed into the product. Cryolite and the remaining fillers were then added except asbestos and this product was then mixed until uniform. The lid in the pressure mixer was then opened, asbestos fibre was added, and the resulting product was again mixed. This resulting mix was then passed through a hammer mill (to open the fibre) after which it is was dried for a period of 15 hours at 150° F. The resulting composition was then pressed in molds for a period of 2½ hours at 325° F. at a pressure of 5000 p.s.i. The resulting composition shoes were then baked in clamps for approximately 10 hours to 380° F. on a rising temperature cycle.

The Buna GR-S rubber used in this example was a 23% Styrene-butadiene emulsion polymer known as GR-S 1009. The "cashew polymer" used was a cashew nut shell liquid resin NC–303 sold by Minnesota Mining and Manufacturing Co. bodied by hexamethylene tetramine; this cashew polymer NC–303 is a solvent-free polymerized resin derived from cashew nut shell liquid having a viscosity at 25° C., cps. of a range of 140 to 200 and a gel time in minutes of from 4.0 to 6.5. The "cashew resin" was one sold as NC–300 by the Minnesota Mining and Manufacturing Co.; this cashew resin is an 80% solution in toluene of a polymerized resin derived from cashew nut shell liquid having a viscosity at 25° C., cps. of 125 to 165 and a gel time in minutes of from 30 to 45. The calcined petroleum coke was National Carbon's W-8300 and the white iron grit was Cleveland Metal Abrasive's G–120.

The total organic bond content of the example, which bond content includes the rubber, cashew polymer, cashew resin, hexa and sulphur is 20.35% by weight of the total composition. The cryolite used is 10.0% by weight of the composition.

The particle size distribution of the white iron grit in Example I is illustratively as follows:

| On 60 mesh screen | 0.68 |
|---|---|
| On 80 mesh screen | 33.75 |
| On 100 mesh screen | 10.83 |
| On 140 mesh screen | 25.18 |
| On 170 mesh screen | 8.17 |
| On 200 mesh screen | 7.09 |
| Minus 200 mesh screen | 13.95 |

It is found on tests that brake shoes of this composition, compared to known standard composition brake shoes employing hard mineral fillers and an organic bond, all other factors and characteristics being equal, improve the wheel tread wear by more than 100%, the average wheel tread wear of the composition of this Example I being about ⅓ of that of such known composition brake shoes.

Example II

This example is similar to Example I, with the cryolite ingredient increased, however, to a 15% weight content.

|  | Weight Percent | Volume Percent |
|---|---|---|
| Milled Rubber Bond: |  |  |
| GRS-1009 | 5.44 | 14.44 |
| Sulfur | 1.64 | 1.97 |
| Litharge | 4.08 | 1.07 |
| Cashew Polymer | 2.72 | 6.77 |
| Lead Powder | 1.36 | .30 |
| Carbon Black | .73 | 1.02 |
| Hexa | .36 | .90 |
| MgO | 1.81 | 1.42 |
| Total Bond | 18.14 | 27.89 |
| Graphite | 5.65 | 5.95 |
| Galena | 9.45 | 3.14 |
| NC-300, Cashew Resin, solids | 9.07 | 22.58 |
| Calcined Kyanite | 11.34 | 8.05 |
| Calcined Petroleum Coke, W-8300 | 4.92 | 6.45 |
| G-120 Grit | 18.88 | 6.15 |
| Cryolite, Brown | 15.00 | 12.44 |
| Asbestos | 7.55 | 7.35 |
|  | 100.00 | 100.00 |

The ingredients of the example are compounded in the same manner as in Example I.

The total organic bond content in this Example II is 19.23% by weight of the total composition, the cryolite content being 15% by weight of the composition.

Example III

This example illustrates the use of cryolite in the lower end of the range, with the employment, however, of a total organic bond and filler above the indicated range.

|  | Weight Percent | Volume Percent |
|---|---|---|
| Milled Rubber Bond: |  |  |
| GRS Synthetic rubber | 7.74 | 19.14 |
| Sulfur | 3.19 | 3.47 |
| Carbon Black | .96 | 1.22 |
| Litharge | 5.40 | 1.35 |
| Lead Powder | 1.91 | 0.40 |
| Magnesium Oxide | 2.24 | 1.63 |
| NC-300 liquid cashew resin (solids) | 2.60 | 6.00 |
| G-120 White iron grit | 19.10 | 5.65 |
| Galena | 9.55 | 3.05 |
| Calcined Kyanite | 9.55 | 6.33 |
| Graphite | 6.05 | 5.95 |
| Hard (cured) Rubber Dust | 19.10 | 33.04 |
| Barytes | .42 | .20 |
| Graphite modified cardolite dust (16.66% graphite) | 3.82 | 7.73 |
| Aluminum bronze chips | 3.82 | 1.30 |
| Cryolite, coarse, –14 mesh | 4.55 | 3.54 |
|  | 100.00 | 100.00 |

The Cardolite in this example comprises a cured cashew resin. The cryolite content in this example is 4.55% by weight; and the total organic content including the hard rubber dust is 31.9% by weight of the shoe composition. It is found that the shoe of this composition exhibits a marked improvement, namely over 50%, in wheel tread or wear over the known standard composition brake shoes referred to. The shoe of this example, however, possesses poorer shoe life and stability, when compared to those of the preceding examples, due to the use of the higher organic bond content beyond the indicated range.

The making of the molded composition brake shoes of the present invention, their use, physical characteristics and advantages in operation for heavy duty service such as railroad brake shoes or blocks, are believed to be apparent from the above detailed description thereof. It will be further apparent that changes may be made in the ingredients and ingredient proportions in the composition without departing from the spirit of the invention as defined in the following claims.

We claim:

1. A molded composition brake shoe comprising the combination of (a) an organic heat-softening bond matrix comprising a mixture of a synthetic rubber selected from the class of butadiene-styrene copolymers and a resin selected from the class of cashew nut shell liquid resins, (b) a hard mineral filler having a hardness of at least 6 on the Moh scale, with (c) the addition thereto of cryolite; the organic bond, the hard mineral filler and the cryolite comprising together the essential and major ingredients by weight of the composition, the hard mineral filler being in a proportion to impart a wet to dry friction ratio approaching unity, and the cryolite being in a proportion less than that of the organic bond or the hard mineral filler and being effective to impart improved wheel tread life to the brake shoe.

2. The molded composition brake shoe of claim 1 in which the organic bond is in the proportion of 15% to 32% by weight of the composition, the hard mineral filler is in the proportion in the range of 30% by weight of the composition, and the cryolite is in the proportion of 5% to 15% by weight of the composition.

3. The molded composition brake shoe of claim 1 in which the hard mineral filler is selected from the class consisting of hard iron particles, calcined kyanite, silica sand, silica gel, and combinations thereof.

4. A molded composition brake shoe comprising the combination of (a) an organic heat-softening bond matrix comprising a mixture of a synthetic rubber selected from the class of butadiene-styrene copolymers and a resin selected from the class of cashew nut shell liquid resins, (b) a hard mineral filler having a hardness of at least 6 on the Moh scale, (c) and other inorganic fillers, with (d) the addition thereto of cryolite; the organic bond, the hard mineral filler and the cryolite comprising together the essential and major ingredients by weight of the composition, the hard mineral filler being in a proportion to impart a wet to dry friction ratio approaching unity, and the cryolite being in a proportion less than that of the organic bond or the hard mineral filler and being effective to impart improved wheel tread life to the brake shoe.

5. The composition of claim 4 in which the organic bond is in the proportion of 15% to 32% by weight of the composition, the cryolite is in the proportion of 5% to 15% by weight of the composition, the hard mineral filler is in the proportion in the range of 30% by weight of the composition and in which substantially the remainder of the composition comprises the inorganic fillers.

References Cited by the Examiner

UNITED STATES PATENTS

| 2,669,485 | 2/1954 | Newman et al. | 260—38 |
| 2,686,140 | 8/1954 | de Gaugue | 260—38 |
| 2,901,456 | 8/1959 | Spokes et al. | 260—41.5 |
| 2,935,763 | 5/1960 | Newman et al. | 260—38 |

OTHER REFERENCES

"Cryolite," Pennsylvania Salt Manufacturing Co., 1950, pages 16 and 18.

MORRIS LIEBMAN, *Primary Examiner.*

DANIEL ARNOLD, ALPHONSO D. SULLIVAN, MILTON STERMAN, *Examiners.*